United States Patent

Newberg et al.

[11] Patent Number: 5,805,612
[45] Date of Patent: Sep. 8, 1998

[54] MECHANISM FOR REPEATER ERROR MITIGATION

[75] Inventors: Donald G. Newberg, Schaumburg; Bradley M. Hiben, Glen Ellyn; Robert D. LoGalbo, Bartlett, all of Ill.

[73] Assignee: Motorola, Inc., Schaumburg, Ill.

[21] Appl. No.: 524,491

[22] Filed: Sep. 7, 1995

[51] Int. Cl.⁶ .................................................. H04L 1/00
[52] U.S. Cl. ............................................................ 371/30
[58] Field of Search ................................................ 371/30

[56] References Cited

U.S. PATENT DOCUMENTS 5,517,510  5/1996  Kuban et al. ......................... 371/37.1

OTHER PUBLICATIONS

AP TIA/EIA Interim Standard, "APCO Project 25 Vocoder Description," document number IS–102.BABA, Jul. 1993, provided by the Telecommunications Industry Association, p. 1, lines 28–30, and also from p. 3, line 24 to p. 4, line 16.

*Primary Examiner*—Stephen M. Baker
*Attorney, Agent, or Firm*—Wayne J. Egan

[57] ABSTRACT

An APCO 25 radio communication system 200 includes a repeater 101 arranged to receive signals from an inbound repeater link 103, thereby forming received signals. The repeater 101 is arranged to forward the received signals to a subscriber 121 via an outbound radio frequency path 113. The received signals include two types of packets, namely, packets 105 with correctable errors 107, and "erasure packets" 109 with detectable-but-uncorrectable errors 111. The inbound repeater link is equipped with error correcting means 110 for correcting the correctable errors 107. The inbound repeater link is also equipped with error mitigating means 130 for mitigating the detectable-but-uncorrectable errors 111. The error mitigation is performed in accordance with the improved multi-band excitation ("IMBE") process.

2 Claims, 4 Drawing Sheets

— PRIOR ART —

$$gG = \begin{bmatrix} 1 & 0 & & & & & & & & & & & & 1 & 1 & 0 & 0 & 0 & 1 & 1 & 1 & 0 & 1 & 0 \\ 0 & 1 & 0 & & & & & & & & & & & 0 & 1 & 1 & 0 & 0 & 0 & 1 & 1 & 1 & 0 & 1 \\ & 0 & 1 & 0 & & & & & & & & & & 1 & 1 & 1 & 1 & 0 & 1 & 1 & 0 & 1 & 0 & 0 \\ & & 0 & 1 & 0 & & & & & & & & & 0 & 1 & 1 & 1 & 1 & 0 & 1 & 1 & 0 & 1 & 0 \\ & & & 0 & 1 & 0 & & & & & & & & 0 & 0 & 1 & 1 & 1 & 1 & 0 & 1 & 1 & 0 & 1 \\ & & & & 0 & 1 & 0 & & & & & & & 1 & 1 & 0 & 1 & 1 & 0 & 0 & 1 & 1 & 0 & 0 \\ & & & & & 0 & 1 & 0 & & & & & & 0 & 1 & 1 & 0 & 1 & 1 & 0 & 0 & 1 & 1 & 0 \\ & & & & & & 0 & 1 & 0 & & & & & 0 & 0 & 1 & 1 & 0 & 1 & 1 & 0 & 0 & 1 & 1 \\ & & & & & & & 0 & 1 & 0 & & & & 1 & 1 & 0 & 1 & 1 & 1 & 0 & 0 & 0 & 1 & 1 \\ & & & & & & & & 0 & 1 & 0 & & & 1 & 0 & 1 & 0 & 1 & 0 & 0 & 1 & 0 & 1 & 1 \\ & & & & & & & & & 0 & 1 & 0 & & 1 & 0 & 0 & 1 & 0 & 0 & 1 & 1 & 1 & 1 & 1 \\ & & & & & & & & & & 0 & 1 & 1 & 0 & 0 & 0 & 1 & 1 & 1 & 0 & 1 & 0 & 1 \end{bmatrix}$$

*FIG. 5*

$$gH = \begin{bmatrix} 1 & 0 & & & & & & & & & & 1 & 1 & 1 & 1 \\ 0 & 1 & 0 & & & & & & & & & 1 & 1 & 1 & 0 \\ & 0 & 1 & 0 & & & & & & & & 1 & 1 & 0 & 1 \\ & & 0 & 1 & 0 & & & & & & & 1 & 1 & 0 & 0 \\ & & & 0 & 1 & 0 & & & & & & 1 & 0 & 1 & 1 \\ & & & & 0 & 1 & 0 & & & & & 1 & 0 & 1 & 0 \\ & & & & & 0 & 1 & 0 & & & & 1 & 0 & 0 & 1 \\ & & & & & & 0 & 1 & 0 & & & 0 & 1 & 1 & 1 \\ & & & & & & & 0 & 1 & 0 & & 0 & 1 & 1 & 0 \\ & & & & & & & & 0 & 1 & 0 & 0 & 1 & 0 & 1 \\ & & & & & & & & & 0 & 1 & 0 & 0 & 1 & 1 \end{bmatrix}$$

*FIG. 6*

MECHANISM FOR REPEATER ERROR MITIGATION

FIELD OF THE INVENTION

This application relates to error mitigation including, but not limited to mechanisms for repeater error mitigation.

BACKGROUND OF THE INVENTION

When voice is forwarded by repeaters in APCO 25 Improved Multi-Band Excitation (hereinafter "IMBE") radio systems, bit errors are accumulated on both the inbound and outbound paths. Because these bit errors map directly into degraded audio quality, it is important to either correct these errors if possible or mitigate their effects otherwise.

A prior art system is shown in FIG. 1. There is shown a prior art APCO 25 IMBE radio system 100 equipped with error correction 110 only. Referring now to FIG. 1, there is shown an inbound repeater link 103 arranged to provide signals to a repeater 101. As shown, the inbound repeater link 103 is equipped with error correction means 110. The repeater 101, in turn, is arranged to re-transmit or forward the signals to at least one subscriber 121 by means of an outbound radio frequency path 113. The subscriber 121, in turn, is equipped with an error mitigation means 120, in accordance with the normal Improved Multi-Band Excitation (hereinafter "IMBE") mitigation scheme provided by the TIA/EIA Interim Standard, "APCO Project 25 Vocoder Description,"document number IS-102.BABA, July 1993, provided by the Telecommunications Industry Association (hereinafter "APCO Project 25 Vocoder Description").

Referring still to FIG. 1, when a packet 105 containing a correctable error 107 is received, it is corrected by the error correction means 110, and then forwarded by the repeater 101 to the subscriber 121 via the outbound radio frequency path 113. In FIG. 1, this latter error-corrected corrected packet is depicted by element 155 with the corrected error itself depicted by element 157.

Referring still to FIG. 1, due to the limits of the error correction codes, some error combinations cannot be corrected. A portion of these uncorrectable error combinations are detectable, however, and packets having such detectable-but-uncorrectable errors are termed "erasure packets." In FIG. 1, such an erasure packet (with a detectable-but-uncorrectable error) is depicted by element 109, with the detectable-but-uncorrectable error itself depicted as element 111. No mechanism is present in the repeater 101 to detect and mitigate these erasure packets 109. Instead, these erasure packets 109 with detectable-but-uncorrectable errors are simply forwarded onto the outbound radio frequency path 113. In FIG. 1, the erasure packet 109 that has been forwarded or transmitted is depicted by element 129. Because additional bit errors may be acquired on the outbound path, erasure packets that could have been detected at the repeater 101 might be mapped to valid but incorrect codewords when received by the subscriber 121. Since experience has shown that proper handling of erasure packets is necessary for peak audio quality, discarding erasure information at the repeater 101 will lower system sensitivity.

Therefore, there is a need for providing a mechanism for repeater error mitigation.

BRIEF DESCRIPTION OF THE DRAWINGS

FIGS. 3–6 depict several error control coding processes in accordance with section 7.3 of the APCO Project 25 Vocoder Description.

DESCRIPTION OF THE PREFERRED EMBODIMENT

Figure 1:
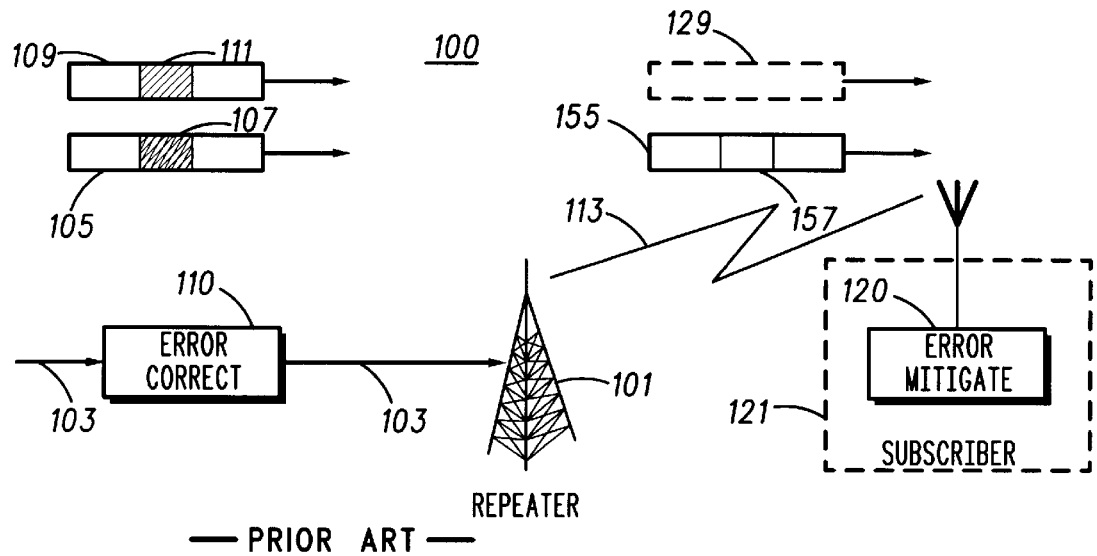
FIG. 1 is a block diagram that shows an APCO 25 IMBE radio system, as in the prior art.

Briefly, in accordance with the present invention, an APCO 25 radio communication system 200 includes a repeater 101 arranged to receive signals from an inbound repeater link 103, thereby forming received signals. The repeater 101 is arranged to forward the received signals to a subscriber 121 via an outbound radio frequency path 113. The received signals include two types of packets, namely, packets 105 with correctable errors 107, and erasure packets 109 with detectable-but-uncorrectable errors 111. The inbound repeater link 103 is equipped with error correcting means 110 for correcting the correctable errors 107. The inbound repeater link 103 is also equipped with error mitigating means 130 for mitigating the detectable-but-uncorrectable errors 111. The error mitigation is performed in accordance with the improved multiband excitation ("IMBE") process.

Figure 2:
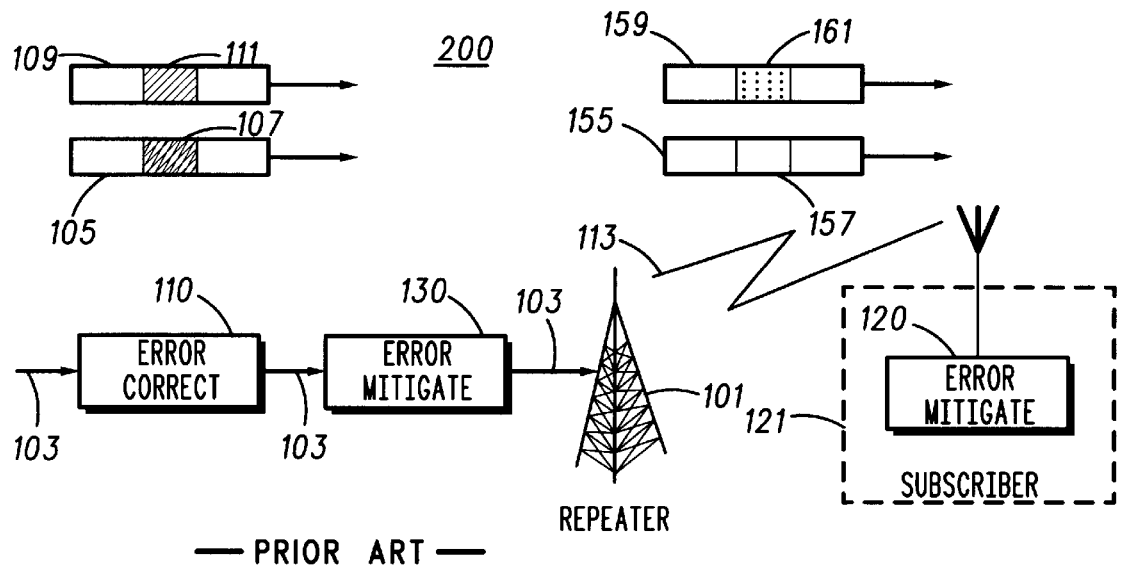
FIG. 2 is a block diagram that shows the radio system of FIG. 1 as equipped with a mechanism for repeater error mitigation, in accordance with the present invention.

Referring now to FIG. 2, the inbound repeater link 103 is now equipped with an error mitigation means 130 in addition to the previous error correction means 110. Thus, error mitigation 130 is performed at the repeater 101 along with the normal error correction 110, thus transmitting an error-mitigated packet 159 to the subscriber 121 by means of the outbound radio frequency path 113. The error-mitigated packet as forwarded by the repeater 101 over the outbound radio frequency path 113 is depicted as element 159, with the mitigated error itself depicted as element 161. Since the over-the-air protocol will not change, APCO 25 compatibility will not be effected. Because error mitigation generally requires a substitution of speech information, the present invention is limited to unencrypted systems.

In one embodiment, this error mitigation provided by element 130 is performed in accordance with the IMBE process mentioned above.

Referring now to the aforementioned document, "APCO Project 25 Vocoder Description," document number IS-102.BABA, the sections believed to be most pertinent to performing the error mitigation process embodied in elements 120 and 130 are described as follows:

In section 7.3, page 41, "Error Control Coding," (hereinafter "ECC"), the error correction codes are described and references given that describe their implementation. These types of ECC decoders are well-known and could be created based on these references. The following text is reproduced from section 7.3:

7.3 Error Control Coding

At 7.2 kbps with a 20 ms frame size, 144 bits per frame are available for voice coding. The IMBE speech coder uses 88 of these bits to quantize the model parameters and provide synchronization, and the remaining 56 bits are used for forward error correction. The 56 error control bits are divided between four [23,12] Golay codes and three [15,11] Hamming codes.

The reader is referred to A. Levesque and A. Michelson, *Error-Control Techniques for Digital Communication*, Wiley, 1985, and Lin and Costello, *Error Control Coding: Fundamentals and Applications*, Prentice-Hall, 1983 for more information on the encoding and decoding of Golay and Hamming codes.

The generation of the eight code vectors $\hat{v}_i$ for $0<i<7$ is performed according to the following set of equations, $$\hat{v}_i = \hat{u}_i \cdot g_G \quad \text{for } 0 \leq i \leq 3 \tag{81}$$

$$\hat{v}_i = \hat{u}_i \cdot g_H \quad \text{for } 4 \leq i \leq 6 \tag{82}$$

$$\hat{v}_7 = \hat{u}_7 \tag{83}$$

where the $g_G$ and $g_H$ are the generator matrices for the [23,12] Golay code and the [15,11] Hamming code, respectively. These are shown below where absent entries are assumed to equal zero. Note that all operations are modulo 2, and the vectors $\hat{v}_i$ and $\hat{u}_i$ are assumed to be row vectors, where the "left" most bit is the MSB. This convention is used throughout this section.

Figure 3:
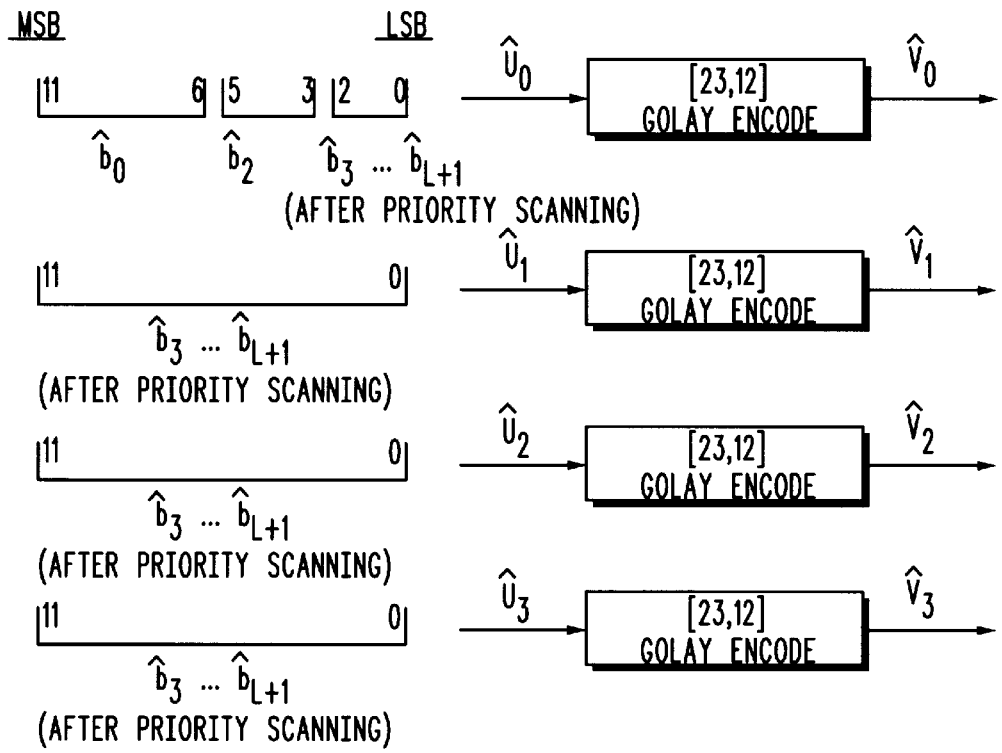

The formation of code vectors $\hat{v}_0$ through $\hat{v}_3$ is depicted in FIG. 3 (this appears as FIG. 23 in section 7.3).

Figure 4:
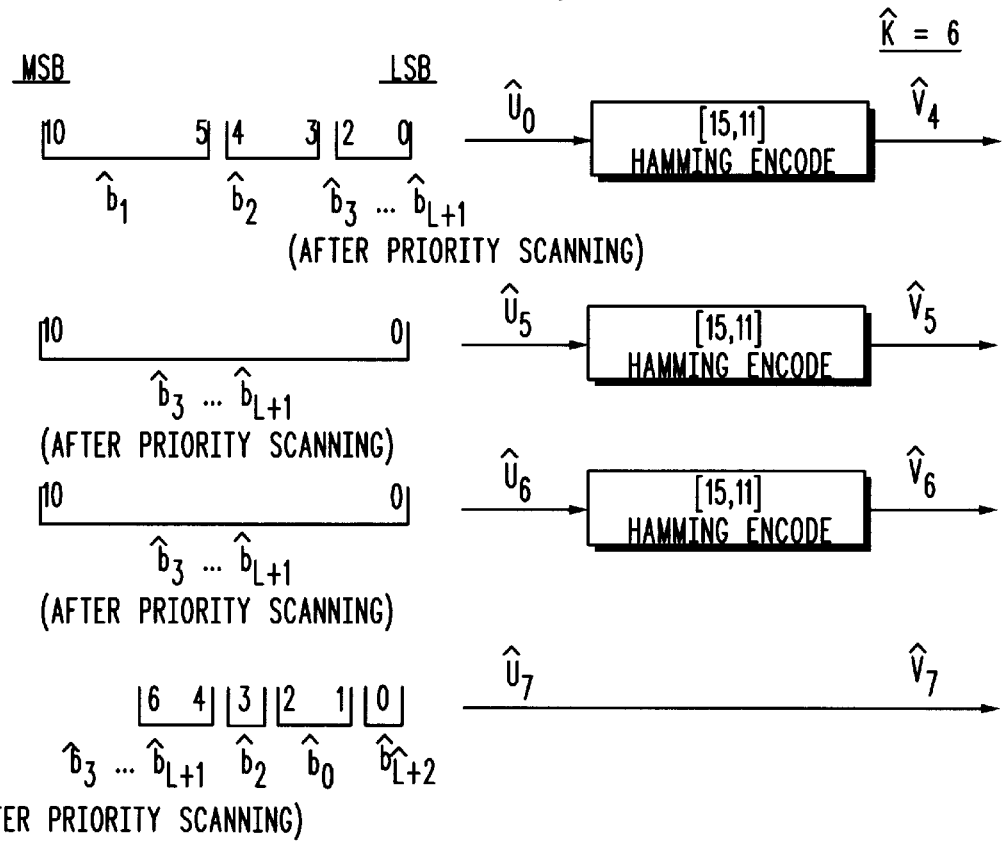

The formation of code vectors $\hat{v}_4$ through $\hat{v}_7$ is depicted in FIG. 4 (this appears as FIG. 24 in section 7.3).

FIG. 5 depicts $g_G$; while this material appears in section 7.3, it is not designated there as a "Figure."

FIG. 6 depicts $g_H$; while this material appears in section 7.3, it is not designated there as a "Figure."

(End of material reproduced from section 7.3.

As is known, bit modulation is used to detect errors that escape the normal ECC process. In section 7.4, page 43, "Bit Modulation," a detailed description is given on how the bits are manipulated to perform this bit modulation. The following text is reproduced from section 7.4;

7.4 Bit Modulation

The IMBE speech coder uses bit modulation keyed off the code vector $\hat{v}_0$ to provide a mechanism for detecting errors in $\hat{v}_0$ beyond the three errors that the [23,12] Golay code can correct. Note that the term bit modulation in the context of this document refers to the presented method for multiplying (or modulating) each frame of code vectors by a data dependent pseudo-random sequence. The first step in this procedure is to generate a set of binary modulation vectors which are added (modulo 2) to the code vectors $\hat{v}_0$ through $\hat{v}_7$. The modulation vectors are generated from a pseudo-random sequence whose seed is derived from $\hat{u}_0$. Specifically, the sequence defined in the following equations is used, $$p_r(0) = 16\hat{u}_0 \tag{84}$$

$$p_r(n) = 173 p_r(n-1) + 13849 - 65536 \lfloor \frac{173 p_r(n-1) + 13849}{65536} \rfloor \tag{85}$$

where the bit vector $\hat{u}_0$ is interpreted as an unsigned 12 bit number in the range [0, 4095]. Equation (85) is used to recursively compute the pseudo-random sequence, $p_r(n)$, over the range $1 \leq n \leq 114$. Each element of this sequence can be interpreted as a 16 bit random number which is uniformly distributed over the interval [0, 65535]. Using this interpretation, a set of binary modulation vectors, denoted by $\hat{m}_0$ through $\hat{m}_7$, are generated from this sequence as shown below.

$$\hat{m}_0 = [0, 0, \ldots, 0] \tag{86}$$

$$\hat{m}_1 = \left[ \lfloor \frac{p_r(1)}{32768} \rfloor, \lfloor \frac{p_r(2)}{32768} \rfloor, \ldots, \lfloor \frac{p_r(23)}{32768} \rfloor \right] \tag{87}$$

$$\hat{m}_2 = \left[ \lfloor \frac{p_r(24)}{32768} \rfloor, \lfloor \frac{p_r(25)}{32768} \rfloor, \ldots, \lfloor \frac{p_r(46)}{32768} \rfloor \right] \tag{88}$$

$$\hat{m}_3 = \left[ \lfloor \frac{p_r(47)}{32768} \rfloor, \lfloor \frac{p_r(48)}{32768} \rfloor, \ldots, \lfloor \frac{p_r(69)}{32768} \rfloor \right] \tag{89}$$

$$\hat{m}_4 = \left[ \lfloor \frac{p_r(70)}{32768} \rfloor, \lfloor \frac{p_r(71)}{32768} \rfloor, \ldots, \lfloor \frac{p_r(84)}{32768} \rfloor \right] \tag{90}$$

$$\hat{m}_5 = \left[ \lfloor \frac{p_r(85)}{32768} \rfloor, \lfloor \frac{p_r(86)}{32768} \rfloor, \ldots, \lfloor \frac{p_r(99)}{32768} \rfloor \right] \tag{91}$$

$$\hat{m}_6 = \left[ \lfloor \frac{p_r(100)}{32768} \rfloor, \lfloor \frac{p_r(101)}{32768} \rfloor, \ldots, \lfloor \frac{p_r(114)}{32768} \rfloor \right] \tag{92}$$

$$\hat{m}_7 = [0, 0, \ldots, 0] \tag{93}$$

Once these modulation vectors have been computed in this manner, the modulated code vectors, $\hat{v}_0$ for $0 \leq i \leq 7$, are computed by adding (modulo 2) the code vectors to the modulation vectors.

$$\hat{c}_i = \hat{v}_i + \hat{m}_i \quad \text{for } 0 \leq i \leq 7 \tag{94}$$

One should note that the bit modulation performed by the IMBE encoder can be inverted by the decoder if $\hat{c}_0$ does not contain any uncorrectable bit errors. In this case Golay decoding $\hat{c}_0$, which always equals $\hat{v}_0$ since $\hat{m}_0=0$, will yield the correct value of $\hat{u}_0$. The decoder can then use $\hat{u}_0$ to reconstruct the pseudo-random sequence and the modulation vectors $\hat{m}_1$ through $\hat{m}_7$. Subtracting these vectors from $\hat{c}_1$ though $\hat{c}_7$ will then yield the code vectors $\hat{v}_1$ though $\hat{v}_7$. At this point the remaining error control decoding can be performed. In the other case, where $\hat{c}_0$ contains uncorrectable bit errors, the modulation cannot generally be inverted by the decoder. In this case the likely result of Golay decoding $\hat{c}_0$ will be some $\hat{u}_0$ which does not equal $\hat{u}_0$. Consequently the decoder will initialize the pseudo-random sequence incorrectly, and the modulation vectors computed by the decoder will be uncorrelated with the modulation vectors used by the encoder. Using these incorrect modulation vectors to reconstruct the code vectors is essentially the same as passing $\hat{v}_1, \ldots, \hat{v}_6$ through a 50 percent bit error rate (BER) channel. The IMBE decoder exploits the fact that, statistically, a 50 percent BER causes the Golay and Hamming codes employed on $\hat{v}_1$ through $\hat{v}_6$ to correct a number of errors which is near the maximum capability of the code. By counting the total number of errors which are corrected in all of these code vectors, the decoder is able to reliably detect frames in which $\hat{c}_0$ is likely to contain uncorrectable bit errors. The decoder performs frame repeats during these frames in order to reduce the perceived degradation in the presence of bit errors. This is explained more fully in Sections 7.6 and 7.7.

(End of text reproduced from section 7.4.)

As is known, the IMBE decoder estimates the number of received errors based on the outputs of the ECC decoding process. In section 7.6, page 45, "Error Estimation," detailed formulas are given for estimating the error rate. The following text is produced from section 7.6:

7.6 Error Estimation

The IMBE speech decoder estimates the number of errors in each received data frame by computing the number of errors corrected by each of the [23,12] and [15,11] Hamming codes. The number of errors for each code vector is denoted $\epsilon_i$ for $0<i<6$, where $\epsilon_i$ refers to the number of bit errors which were corrected during the error decoding of $\hat{u}_i$. From these error values two other error parameters are computed as shown below.

$$\epsilon_T = \sum_{i=0}^{6} \epsilon_i \qquad (95)$$

$$\epsilon_R(0) = .95 * \epsilon_R(-1) + .000356\epsilon_T \qquad (96)$$

The parameter $\epsilon_R(0)$ is the estimate of the error rate for the current frame, while $\epsilon_R(-1)$ is the estimate of the error rate for the previous frame. These error parameters are used to control the frame repeat process described below, and to control the parametric smoothing functions described in Section 9.

(End of text reproduced from section 7.6.).

In section 7.7, page 45, "Packet Repeats," there is detailed the error mitigation process. Based on the error estimation and invalid parameters, bad packets can be detected. If a bad packet is detected, a detailed process is given for re-transmitting these packets (error mitigation). The following text is reproduced from section 7.7:

7.7 Frame Repeats

The IMBE decoder examines each received data frame in order to detect and discard frames which are highly corrupted. A number of different fault conditions are checked and if any of these conditions indicate the current frame is invalid, then a frame repeat is performed. The IMBE speech encoder uses values of $\hat{b}_0$ in the range $0 \leq \hat{b}_0 \leq 207$ to represent valid pitch estimates. In addition values of $\hat{b}_0$ in the range $216 \leq \hat{b}_0 \leq 219$ are used by encoder to represent silence frames. The remaining values of $\hat{b}_0$ are reserved for future expansion and are currently considered invalid. A frame repeat is performed by the decoder if it receives an invalid value of $\hat{b}$, or if both of the following two equations are true.

$$\epsilon_0 \geq 2 \qquad (97)$$

$$\epsilon_T \geq 11 \qquad (98)$$

These two equations are used to detect the incorrect bit demodulation which results if there are uncorrectable bit errors in $\hat{c}_0$. The decoder performs a frame repeat by taking the following steps:

1) The current 144 bit received data frame is marked as invalid and subsequently ignored during future processing steps.

2) The IMBE model parameters for the current frame are set equal to the IMBE model parameters for the previous frame. Specifically, the following update expressions are computed.

$$\hat{w}_0(0) = \hat{w}_0(-1) \qquad (99)$$

$$\hat{L}(0) = \hat{L}(-1) \qquad (100)$$

$$\hat{K}(0) = \hat{K}(-1) \qquad (101)$$

$$\hat{v}_k(0) = \hat{v}_k(-1) \text{ for } 1 < k \leq \hat{K} \qquad (102)$$

$$\hat{M}_l(0) = \hat{M}_l(-1) \text{ for } 1 \leq l < \hat{L} \qquad (103)$$

$$\hat{M}_l(0) = \hat{M}_l(-1) \text{ for } 1 < l < \hat{L} \qquad (104)$$

3) The repeated model parameters are used in all future processing wherever the current model parameters are required. This includes the synthesis of the current segment of speech as is described in Section 11.

(End of text reproduced from section 7.7.)

In section 7.8, page 47, "Silence Packet Transmission and Packet Muting," an exact description is given for the detection of severe bit error conditions and the subsequent packet muting (error mitigation) that should be performed. The following is reproduced from section 7.8:

7.8 Silence Frame Transmission and Frame Muting

As discussed in section 6.1, the IMBE encoder allocates the value of $\hat{b}_0 = 216$ to represent a silence frame. The detailed procedure for transmitting a silence frame is for the encoder to bypass the bit polarization and to instead set the bit vectors $\hat{u}_0, \ldots, \hat{u}_7$ equal to the binary values shown in Table 5. Note that the frame synchronization bit in bit vector $\hat{u}_7$ binary values shown in Table 5) must still alternate as described in Section 6.5.

TABLE 5

Silence Frame Bit Vectors

| i | $\hat{u}_i$ |
| --- | --- |
| 0 | 110 110 000 000 |
| 1 | 000 000 000 000 |
| 2 | 000 000 000 000 |
| 3 | 000 000 000 000 |
| 4 | 00 000 000 000 |
| 5 | 00 000 000 000 |
| 0 | 00 000 000 000 |
| 7 | 0 000 00* |

The IMBE decoder should output a silence frame whenever it receives a value of $\hat{b}_0$ in the range $216 \leq \hat{b}_0 \leq 219$. It is necessary for the decoder to produce a silence frame for all four of these values, rather than just for $\hat{b}_0 = 216$, due to the fact that the two least significant bits are not protected from channel errors. The decoder must also be designed to output silence frames in severe bit error environments for which $\epsilon_R > 0.0875$. This feature causes the decoder to squelch its output if reliable communication cannot be supported.

The recommended muting method is to first compute the update equations as listed in step (2) of the frame repeat process (see Section 7.7. The decoder should then bypass the speech synthesis algorithm described in Section 11 and, instead, set the synthetic speech signal, $\hat{s}(n)$ to random noise which is uniformly distributed over the interval $[-5, 5]$. This technique provides for a small amount of "comfort noise" as is typically done in telecommunication systems.

(End of text reproduced from section 7.8.)

Figure 7A:
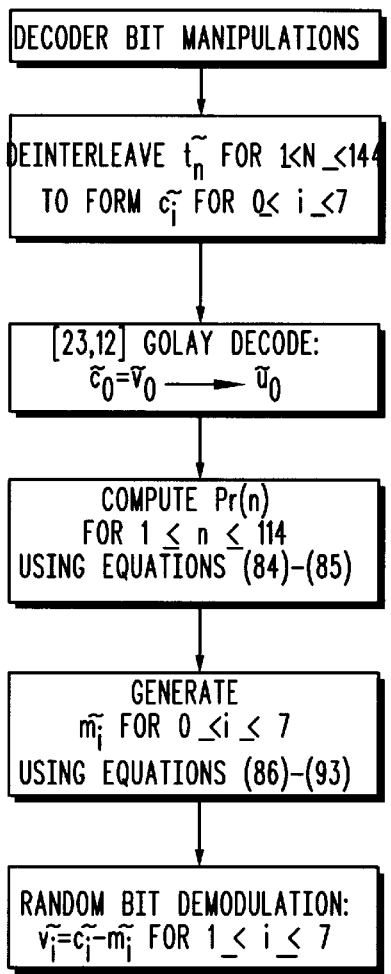
FIGS. 7A–7B depict a flow chart for an IMBE decoder in accordance with the APCO Project 25 Vocoder Description.
Figure 7B:
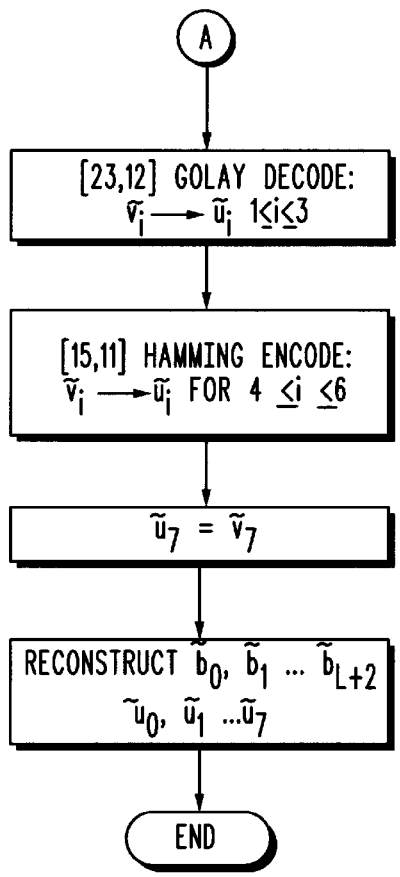

In "Flow Chart 11," pages 117–118, a flow chart for the IMBE decoder is given, showing the location of the various ECC decoding and parameter reconstruction. The flow chart from pages 117–118 is reproduced in FIGS. 7A–7B.

As is known, commercial embodiments of the IMBE process are available from Digital Voice Systems, Inc., One Van de Graaff Drive, Burlington, Mass. 01803, USA, voice (617) 270-1030, fax (617) 270-1066.

The present invention resolves the problems and fulfills the needs of the prior art as follows:

When uncorrectable errors 111 are detected on an inbound voice packet 109, the content of the voice fields is change before retransmission by the repeater 101 in order to lessen the negative effect on audio quality. Moreover, the cost and complexity of radio systems is greatly effected by receiver sensitivity. Therefore, anything that improves this sensitivity will either lower the cost of providing a fixed coverage or else provide greater coverage for a fixed cost. Further, this invention permits the APCO 25 radio system to provide greater sensitivity when encryption is not required.

The advantages of the present invention over the prior art are discussed as follows:

Simulations were performed in order to estimate the sensitivity improvement provided by the invention. The prior art method (error correction only) depicted in FIG. 1 was tested by applying an inbound error file to a large number of IMBE voice packets, performing error correction, applying an outbound error file, and performing error correction and mitigation. The present invention depicted in FIG. 2 was tested by applying the same inbound error file to the voice packets, performing error correction and mitigation, applying the same outbound error file, and performing error correction and mitigation. For both cases, statistics were taken on the reliability of the IMBE ECC codewords.

The resulting IMBE voice packets were categorized as a success (all four ECC codewords decoded without errors), erasure (erasure detected using the normal IMBE algorithm), or failure (one or more of the four ECC codewords incorrectly decoded). It was determined that the probability of success is essentially the same for both methods. However, the present invention returns more erasure packets and less failures than the prior art method. Because erasure packets are detectable and have a mechanism to lessen their effect on audio quality, while failures are not detectable, it is believed that trading failures for erasure packets will have a noticeable effect on the perceived audio quality. It was further determined that the present invention provides an advantage of approximately 1% BER for the invention, which is equivalent to about 1 dB less signal strength required.

Referring again to FIG. 2, therefore, there has been shown an APCO 25 IMBE radio communication system 200 including a repeater 101 arranged to receive signals from an inbound repeater link 103, thereby forming received signals, the repeater being further arranged to forward the received signals to an at least one subscriber 121 via an outbound radio frequency path 113, the received signals including packets 105 with correctable errors 107, the received signals further including packets 109 with uncorrectable errors 111, the inbound repeater link including error correcting means 110 for correcting the correctable errors 1–8, the inbound repeater link further including first error mitigating means 130 for mitigating the uncorrectable errors 111 by means of an improved multi-band excitation ("IMBE") process.

Referring still to FIG. 2, as shown, the at least one subscriber 121 includes second error mitigating means 120 for mitigating the uncorrectable errors by means of the IMBE process.

While various embodiments of a mechanism for repeater error mitigation, in accordance with the present invention, have been described hereinabove, the scope of the invention is defined by the following claims.

What is claimed is:

1. A radio communication system including a repeater arranged to receive signals from an inbound repeater link, thereby forming received signals, the repeater being further arranged to forward the received signals to an at least one subscriber via an outbound radio frequency path, the received signals including packets with correctable errors, the received signals further including packets with uncorrectable errors, the inbound repeater link including error correcting means for correcting the correctable errors, the inbound repeater link further including first error mitigating means for mitigating the uncorrectable errors by means of an improved multi-band excitation ("IMBE") process.

2. The radio communication system of claim 1, wherein the at least one subscriber includes second error mitigating means for mitigating the uncorrectable errors by means of the IMBE process.

* * * * *